(12) United States Patent
Chen et al.

(10) Patent No.: US 11,005,548 B2
(45) Date of Patent: May 11, 2021

(54) MULTI-ANTENNA SYSTEM AND CHANNEL CALIBRATION METHOD THEREOF

(71) Applicant: INDUSTRIAL TECHNOLOGY RESEARCH INSTITUTE, Hsinchu (TW)

(72) Inventors: Jia-Ming Chen, Taipei (TW); Hung-Fu Wei, Hsinchu (TW); Jyun-Wei Lai, Taoyuan (TW); Jen-Yuan Hsu, Jincheng Township (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 16/564,938

(22) Filed: Sep. 9, 2019

(65) Prior Publication Data
US 2020/0366356 A1 Nov. 19, 2020

(30) Foreign Application Priority Data

May 15, 2019 (TW) .................................. 108116810

(51) Int. Cl.
*H04B 7/02* (2018.01)
*H04B 7/06* (2006.01)
(Continued)

(52) U.S. Cl.
CPC .......... *H04B 7/0634* (2013.01); *H04B 7/024* (2013.01); *H04B 7/0408* (2013.01); *H04L 25/0204* (2013.01)

(58) Field of Classification Search
CPC .... H04B 7/0626; H04B 7/0413; H04B 7/024; H04B 7/0634; H04B 7/0408; H04L 25/0204
(Continued)

(56) References Cited

U.S. PATENT DOCUMENTS 7,688,884 B2 3/2010 Cioffi et al.
8,009,660 B2 8/2011 Li et al.
(Continued)

FOREIGN PATENT DOCUMENTS

CN 101888353 A 11/2010
CN 102090118 A 6/2011
(Continued)

OTHER PUBLICATIONS

European Search Report issued in Application No. 16206439.8, dated Jul. 10, 2017.
(Continued)

*Primary Examiner* — Emmanuel Bayard
(74) *Attorney, Agent, or Firm* — Birch, Stewart, Kolasch & Birch, LLP

(57) ABSTRACT

A multi-antenna system includes: a server; a first antenna group, provided on a base station and including multiple first antennas including a first representative antenna and a first non-representative antenna, the base station performing intra-group channel estimation to obtain and transmit to the server multiple first inner channel estimation coefficients between the first representative antenna and the first non-representative antenna, and serving a user device; and a reference device, communicating with the server and the first antennas, performing channel estimation between the reference device and the first representative antenna to obtain and transmit to the server multiple first outer channel estimation coefficients between the reference device and the first representative antenna. The server calculates a precoding matrix according to the first inner and first outer channel estimation coefficients, and the base station performs data transmission with the user device according to the precoding matrix.

24 Claims, 12 Drawing Sheets

(51) Int. Cl.
  *H04B 7/0408* (2017.01)
  *H04B 7/024* (2017.01)
  *H04L 25/02* (2006.01)

(58) Field of Classification Search
  USPC .............................. 375/267, 299, 347, 349
  See application file for complete search history.

(56) References Cited

U.S. PATENT DOCUMENTS

| | | | |
|---|---|---|---|
| 8,041,393 | B2 | 10/2011 | Carter et al. |
| 8,422,426 | B2 | 4/2013 | Ko et al. |
| 8,432,891 | B2 | 4/2013 | Li et al. |
| 8,478,203 | B2 | 7/2013 | Wang |
| 8,565,823 | B2 | 10/2013 | Carter et al. |
| 8,625,713 | B2 | 1/2014 | Li et al. |
| 8,992,100 | B2 | 3/2015 | Lim |
| 8,995,410 | B2 | 3/2015 | Balan et al. |
| 9,106,276 | B2 | 8/2015 | Sorrentino et al. |
| 9,219,624 | B2 | 12/2015 | Gao et al. |
| 9,236,998 | B2 | 1/2016 | Wang et al. |
| 9,356,668 | B2 | 5/2016 | Zhang et al. |
| 9,386,465 | B2 | 7/2016 | Forenza et al. |
| 9,392,563 | B2 | 7/2016 | Guo et al. |
| 9,674,724 | B2 | 6/2017 | Kim et al. |
| 2008/0285670 | A1* | 11/2008 | Walton ............ H04L 1/0606 375/260 |
| 2010/0303015 | A1 | 12/2010 | Ko et al. |
| 2011/0103271 | A1 | 5/2011 | Han et al. |
| 2012/0236752 | A1* | 9/2012 | Hu ............ H04B 7/0617 370/252 |
| 2012/0300864 | A1 | 11/2012 | Merlin et al. |
| 2013/0070827 | A1 | 3/2013 | Li et al. |
| 2013/0089123 | A1 | 4/2013 | Rahul et al. |
| 2013/0343215 | A1 | 12/2013 | Li et al. |
| 2014/0160957 | A1 | 6/2014 | Zheng et al. |
| 2014/0362720 | A1 | 12/2014 | Kim et al. |
| 2014/0369321 | A1* | 12/2014 | Tan ............ H04W 56/001 370/336 |
| 2015/0029874 | A1 | 1/2015 | Davydov et al. |
| 2015/0085690 | A1 | 3/2015 | Yi |
| 2015/0181546 | A1* | 6/2015 | Freda ............ H04W 56/0015 370/336 |
| 2015/0222336 | A1 | 8/2015 | Yilmaz et al. |
| 2015/0341096 | A1 | 11/2015 | Gao et al. |
| 2016/0080953 | A1* | 3/2016 | Tokgoz ............ H04W 24/08 455/422.1 |
| 2016/0301484 | A1 | 10/2016 | Zhu et al. |
| 2016/0308624 | A1 | 10/2016 | Rong et al. |
| 2017/0005762 | A1* | 1/2017 | Lau ............ H04B 7/0456 |
| 2017/0093467 | A1* | 3/2017 | Molev Shteiman ............ H04B 7/0695 |
| 2017/0108579 | A1* | 4/2017 | Irvine ............ G01S 5/08 |
| 2017/0171723 | A1* | 6/2017 | Adachi ............ H04L 27/2601 |
| 2017/0214443 | A1 | 7/2017 | Chen |
| 2017/0250740 | A1 | 8/2017 | Liang et al. |
| 2017/0372214 | A1 | 12/2017 | Peng et al. |
| 2018/0014305 | A1* | 1/2018 | Nayebi ............ H04B 7/0413 |
| 2018/0040964 | A1 | 2/2018 | Benjebbour et al. |
| 2018/0159670 | A1 | 6/2018 | Hsu et al. |
| 2019/0181994 | A1 | 6/2019 | Chen et al. |
| 2020/0100203 | A1* | 3/2020 | Lee ............ H04W 64/006 |

FOREIGN PATENT DOCUMENTS

| | | |
|---|---|---|
| CN | 102238113 A | 11/2011 |
| CN | 102523619 A | 6/2012 |
| CN | 103117975 A | 5/2013 |
| CN | 103249080 A | 8/2013 |
| CN | 104754600 A | 7/2015 |
| CN | 104982015 A | 10/2015 |
| CN | 106537828 A | 3/2017 |
| CN | 107005320 A | 8/2017 |
| EP | 2 721 886 B1 | 5/2017 |
| EP | 3 334 224 A1 | 6/2018 |
| KR | 10-2011-0061463 A | 6/2011 |
| TW | 404106 | 9/2000 |
| TW | 201110592 A1 | 3/2011 |
| TW | 201132062 A1 | 9/2011 |
| TW | 201145951 A1 | 12/2011 |
| TW | 201322786 A1 | 6/2013 |
| TW | 201332324 A1 | 8/2013 |
| TW | I519176 B | 1/2016 |
| TW | I587655 B | 6/2017 |
| WO | WO 2012/027880 A1 | 3/2012 |
| WO | WO 2012/161722 A1 | 11/2012 |
| WO | WO 2012/171093 A1 | 12/2012 |
| WO | WO 2013/110226 A1 | 8/2013 |
| WO | WO 2014/018333 A2 | 1/2014 |
| WO | WO 2014/046684 A1 | 3/2014 |
| WO | WO 2014/048158 A1 | 4/2014 |
| WO | WO 2014/121845 A1 | 8/2014 |
| WO | WO 2017/028922 A1 | 2/2017 |

OTHER PUBLICATIONS

Guillaud et al., "Exploitation of Reciprocity in Measured MIMO Channels," IEEE International Communications Conference (ICC), 2010, pp. 1-6.

Hamed et al., "Real-time Distributed MIMO Systems," ACM SIGCOMM 2016 Conference, New York, USA, Aug. 2016, pp. 412-425.

Kaltenberger et al., "Relative Channel Reciprocity Calibration in MIMO/TDD Systems," Future Network and Mobile Summit, 2010, pp. 1-10.

Karakayali et al., "Network Coordination for Spectrally Efficient Communications in Cellular Systems," IEEE Wireless Communications Magazine, vol. 13, No. 4, Aug. 2006, pp. 56-61.

Koivisto et al., "Impact of time and frequency offsets on cooperative multi-user MIMO-OFDM systems," IEEE Int. Symp. On Personal, Indoor, and Mobile Radio Communications, 2009, pp. 3119-3123.

Larsson et al., "Massive MIMO for Next Generation Wireless Systems," IEEE Communications Magazine, Feb. 2014, pp. 186-195.

Lu et al., "An Overview of Massive MIMO: Benefits and Challenges," IEEE Journal of Selected Topics in Signal Processing, vol. 8, No. 5, Oct. 2014, pp. 742-758.

Müller-Weinfurtner, "On the Optimality of Metrics for Coarse Frame Synchronization in OFDM: A Comparison," Proc. IEEE Int. Symp. on Personal, Indoor, and Mobile Radio Communications, Boston, MA, Sep. 1998, pp. 533-537.

Office Action issued in U.S. Appl. No. 15/833,416, dated Jun. 4, 2019.

Office Action issued in U.S. Appl. No. 15/857,052, dated May 9, 2019.

Panzner et al., "Deployment and Implementations Strategies for Massive MIMO in 5G," Globecom, 2014, pp. 346-351.

Perlman et al., "An introduction to pCell," http://www.rearden.com/artemis/An-Introduction-to-pCell-White-Paper-150224.pdf, Artemis Networks White Paper, Feb. 2015, pp. 1-99.

Shepard et al., "Argos: Practical Many-Antenna Base Stations," ACM Int'l. Conf. Mobile Computing and Networking, 2012, pp. 53-64.

Van De Beek et al., "ML Estimation of Time and Frequency Offset in OFDM Systems," IEEE Trans. Signal Processing, vol. 45, No. 7, Jul. 1997, pp. 1800-1805.

Zarikoff et al., "Coordinated Multi-Cell Systems: Carrier Frequency Offset Estimation and Correction," IEEE Journal on Selected Areas in Communications, vol. 28, No. 9, Dec. 2010, pp. 1490-1501.

U.S. Office Action for U.S. Appl. No. 15/833,416, dated Dec. 26, 2019.

Chinese Office Action and Search Report dated Apr. 22, 2020 for Application No. 201711387210.0.

Chinese Office Action and Search Report dated Mar. 25, 2020 for Application No. 201711145641.6.

(56) References Cited

OTHER PUBLICATIONS

Taiwanese Office Action and Search Report dated Mar. 23, 2020 for Application No. 108116810.

\* cited by examiner

MULTI-ANTENNA SYSTEM AND CHANNEL CALIBRATION METHOD THEREOF This application claims the benefit of Taiwan application Serial No. 108116810, filed May 15, 2019, the disclosure of which is incorporated by reference herein in its entirety.

TECHNICAL FIELD

The disclosure relates to a multi-antenna system and a channel calibration method thereof.

BACKGROUND

Base stations are densely deployed in an ultra-high density network to enhance system transmission efficiency. However, these base stations are distanced extremely close to one another that they may also interfere one another, causing low system performance.

An ultra-high density network can use joint transmission to increase signal strength and reduce interference. However, the ultra-high density network also faces a challenge of issues of synchronization between base stations and channel calibration for multiple base stations. Therefore, it is also one of the goals of industry as how to improve spectrum utilization efficiency for a multi-antenna system.

SUMMARY

A multi-antenna system provided by exemplary embodiments of the disclosure is capable of simplifying a channel calibration process.

According to an exemplary embodiment of the disclosure, a multi-antenna system includes: a server; a first antenna group, including a plurality of first antennas, the first antennas including a first representative, antenna and at least one first non-representative antenna, the first antennas provided on at least one base station, the at least one base station configured to perform intra-group channel estimation to obtain a plurality of first inner channel estimation coefficients between the first representative antenna and each of the at least one first non-representative antenna and transmit the first inner channel estimation coefficients to the server, wherein the at least one base station serves at least one user device; and at least one reference device, communicating with the server and the first antennas, configured to perform channel estimation between the at least one reference device and the first representative antenna to obtain a plurality of first outer channel estimation coefficients between the at least one reference device and the first representative antenna and transmit the first outer channel estimation coefficients to the server. The server is configured to calculate a precoding matrix according to the first inner channel estimation coefficients and the first outer channel estimation coefficients, and the at least one base station performs data transmission with the at least one user device according to precoding matrix.

According to an exemplary embodiment of the disclosure, a channel calibration method for a multi-antenna system is provided. The multi-antenna system includes a server, a first antenna group, at least one base station and at least one reference device. The first antenna group includes a plurality of first antennas, the first antennas include a first representative antenna and at least one first non-representative antenna, and the first antennas are provided on the least one base station. The channel calibration method includes: performing, by the at least one base station, intra-group channel estimation to obtain and transmit to the server a plurality of first inner channel estimation coefficients between the first representative antenna and each of the at least one first non-representative antenna, wherein the at least one base station serves at least one user device; performing, by the at least one reference device, channel estimation between the at least one reference device and the first representative antenna to obtain and transmit to the server a plurality of outer channel estimation coefficients between the at least one reference device and the first representative antenna; and calculating, by the server, a precoding matrix according to the first inner channel estimation coefficients and the first outer channel estimation coefficients, and performing data transmission with the at least one user device according to the precoding matrix by the at least one base station.

DETAILED DESCRIPTION

Technical terms of the disclosure are based on the general definition in the technical field of the disclosure. If the disclosure describes or explains one or some terms, definitions of the terms are based on the description or explanation of the disclosure. The exemplary embodiments of the disclosure individually have one or more technical features. In possible implementation, one skilled person in the art would selectively implement some or all technical features of any exemplary embodiment, or selectively combine some or all technical features of the exemplary embodiments.

Figure 1:
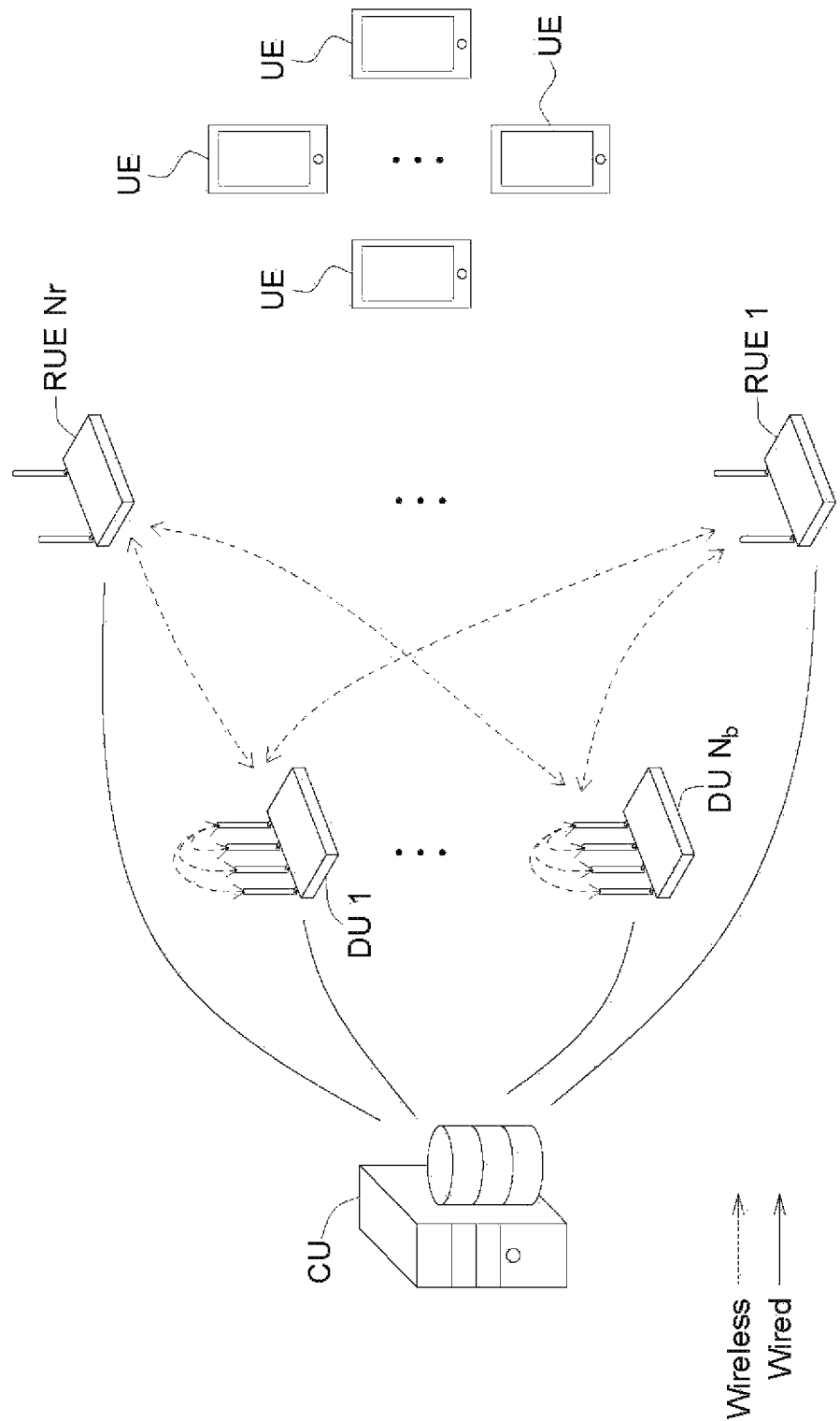
FIG. 1 is a schematic diagram of a multi-antenna system according to an exemplary embodiment of the disclosure.

FIG. 1 shows a schematic diagram of a multi-antenna system, according to an exemplary embodiment of the disclosure. As shown in FIG. 1, a multi-antenna system 100 includes a server CU, at least one base station, and at least one reference device. In FIG. 1, a plurality of base stations DU 1 to DU Nb (where Nb is a positive integer) and a plurality of reference devices RUE 1 to RU Nr (where Nr is a positive integer) are shown. The base stations DU1 to DU Nb may serve a plurality of user devices UE, wherein the user devices UE are different from the reference devices RUE 1 to RUE Nr.

The base stations DU 1 to DU Nb are connected in a wired manner to a server CU. The reference devices RUE 1 to RUE Nr are connected in a wired manner to the server CU. The base stations DU 1 to DU Nr wirelessly communicate with the reference devices RUE 1 to RUE Nr. Each of the base stations DU 1 to DU Nb may include one or more base station antennas. Each of the reference devices RUE 1 to RUE Nr may include one or more reference device antennas.

In this exemplary embodiment, an evolved node B (eNB) in a long-term evolution (LTE) system is taken as an example of the base stations DU 1 to DU Nb. However, the multi-antenna system 100 of the exemplary embodiment is not limited to being used in an LTE system, but is also applicable to other types of communication networks. The reference devices RUE 1 to RUE Nr are, for example, mobile devices, personal computers, or idle base stations. A so-called idle base station refers to a base station that the server CU determines as not currently providing services or currently having a smaller load. By using an idle base station as a reference device, resources can be thoroughly utilized for channel calibration. If there are multiple idle base stations, the server CU can perform scheduling to determine which of the idle base stations serves in turn as a reference device.

Figure 2:
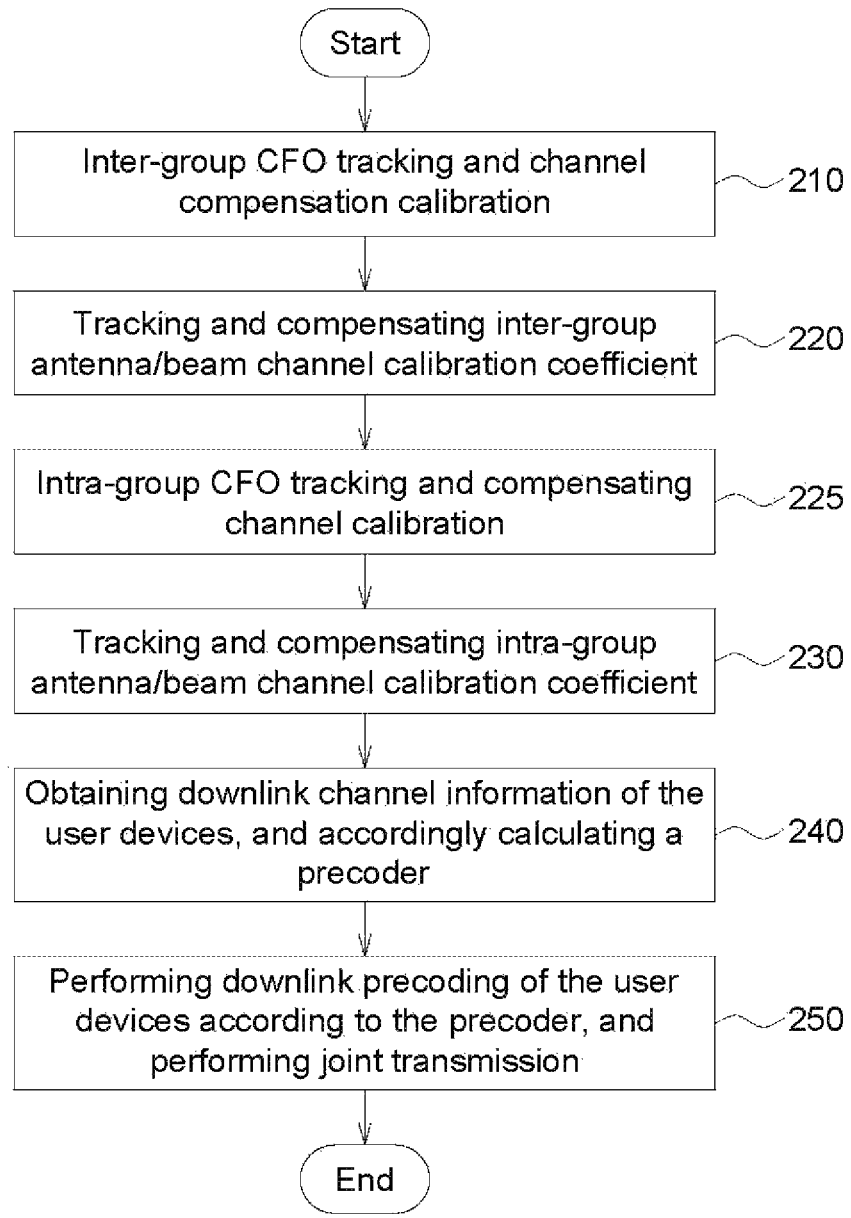
FIG. 2 shows a channel estimation method for a multi-antenna system according to an exemplary embodiment of the disclosure.

FIG. 2 shows a channel calibration method for a multi-antenna system according to an exemplary embodiment of the disclosure. As shown in FIG. 2, in step 210, the server CU performs inter-group carrier frequency offset (CFO) tracking and channel compensation calibration, that is, estimating an outer CFO. In step 220, the server CU tracks and compensates inter-group antenna/beam channel calibration coefficient. In step 225, the server CU performs intra-group CFO tracking and compensates channel calibration, that is, estimating an inner CFO. In step 230, the server CU tracks and compensates intra-group antenna/beam channel calibration coefficient. In step 240, the server CU obtains downlink channel information of the user devices, and accordingly calculates a precoder. In step 250, the server CU performs downlink precoding of the user devices according to the precoder, and performs joint transmission to have the antenna groups (base stations) serve the user devices. Details of step 210 to step 250 are respectively given below.

Figure 3:
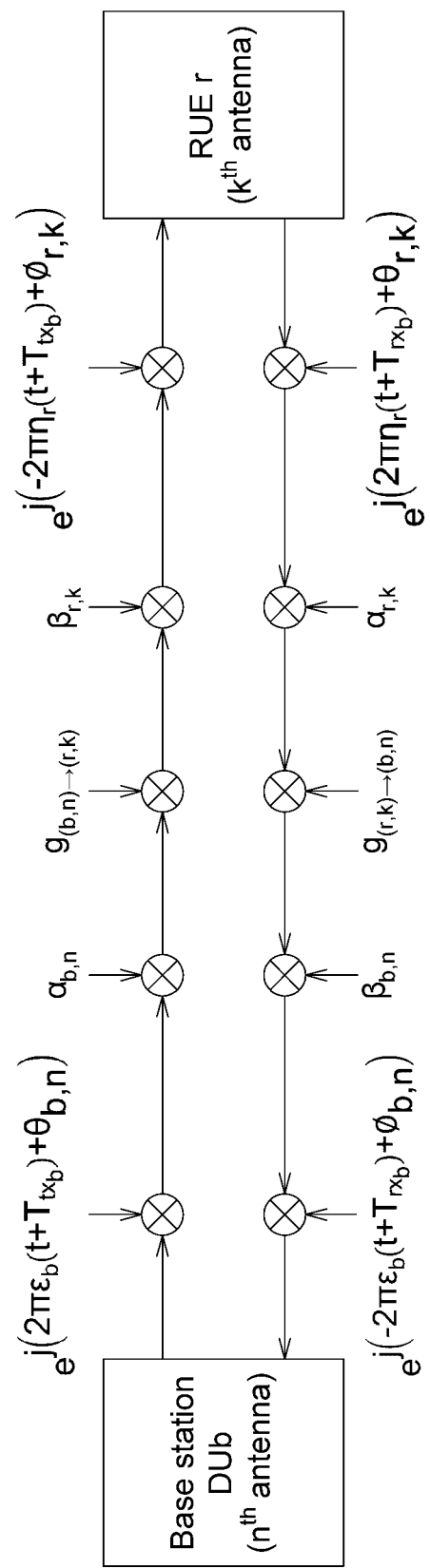
FIG. 3 is a diagram of a link, model used in an exemplary embodiment.

FIG. 3 shows a diagram of a link model used in the exemplary embodiment. In FIG. 3, the leftmost block represents an $n^{th}$ antenna (n=1, 2, ... Nb) of the base station DU b, and the rightmost block represents the $k^{th}$ antenna (k=1, 2, ... Nr) of the reference device RUE r. The arrows on the top (pointing from the $n^{th}$ antenna of the reference device RUE r to the $k^{th}$ antenna of the reference device RUE r) represent a downlink, and arrows at the bottom (pointing from the $k^{th}$ antenna of the reference device RUE r to the $n^{th}$ antenna of the reference device RUE r) represent an uplink. $\alpha$ represents a radio frequency (RF) response of a transmitting end; for example, $\alpha_{b,n}$ represents an RF response of the $n^{th}$ antenna as a transmitting end of the base station DU b, and $\alpha_{r,k}$ represents an RF response of the $k^{th}$ antenna as a transmitting end of the reference device RUE r. $\beta$ represents an RF response of a receiving end; for example, $\beta_{b,n}$ represents an RF response of the $n^{th}$ antenna as a receiving end of the base station DU b, and $\beta_{r,k}$ represents an RF response of the $k^{th}$ antenna as a receiving end of the reference device RUE r. $g_{(b,n) \to (r,k)}$ and $g_{(r,k) \to (b,n)}$ represent wireless channels (where g is a wireless channel having reciprocity). If a wireless channel has reciprocity, then $g_{(b,n) \to (r,k)}$ can be regarded as equivalent to $g_{(r,k) \to (b,n)}$. $\varepsilon$ and $\eta$ respectively represent a frequency carrier of the base station and a frequency carrier of the reference device. $\theta$ and $\phi$ are initial phases.

Figure 4:
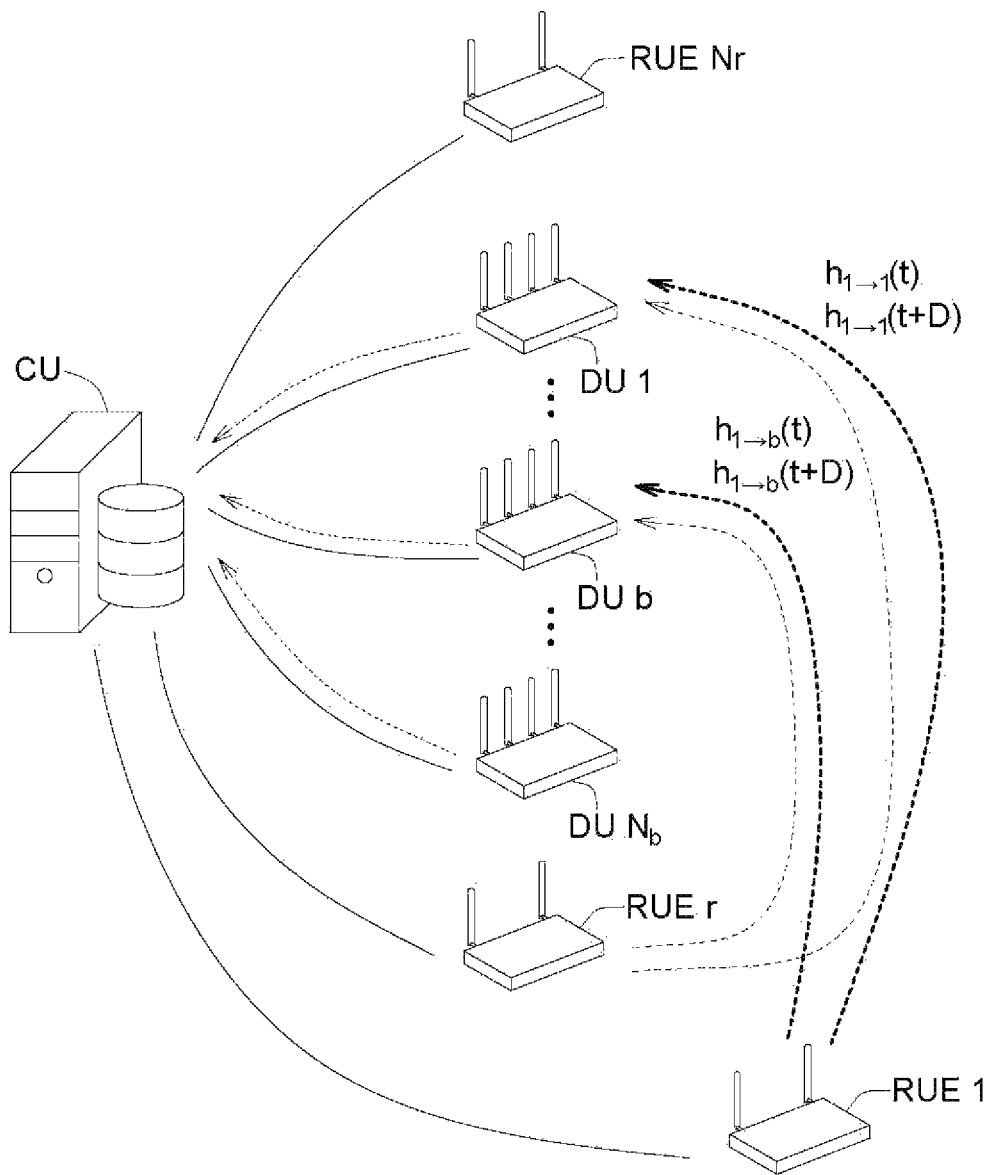
FIG. 4 shows inter-group CFO estimation according to an exemplary embodiment of the disclosure.

FIG. 4 shows inter-group CFO estimation (also referred to as an outer CFO) according to an exemplary embodiment of the disclosure, and are implementation details of step 210 in FIG. 2. As shown in FIG. 4, at a time point t, the reference device RUE 1 transmits a reference signal to a representative antenna of the base station DU 1, as shown by a channel $h_{1 \to 1}(t)$. Similarly, the reference device RUE 1 transmits a reference signal to a representative antenna of the $b^{th}$ antenna group (the base station DU b), as shown by a channel $h_{1 \to b}(t)$. In response to the reference signal transmitted by the reference device RUE 1, the representative antenna of the base station DU b and the representative antenna of the base station DU 1 estimate respective uplink channels to obtain respective uplink channel estimation coefficients, as:

$$\hat{h}_{1 \to b}(t) = h_{1 \to b}(t) \cdot e^{j(-2\pi(\varepsilon_b - \eta 1)t + \theta_r + \phi b)} + z'_b(t) \in C^{N_p \times 1}$$

$$\hat{h}_{1 \to 1}(t) = h_{1 \to 1}(t) \cdot e^{j(-2\pi(\varepsilon_1 - \eta 1)t + \theta_r + \phi 1)} + z'_1(t) \in C^{N_p \times 1}$$

Herein, a coefficient $C_{1b}$ is defined as an inner product of the uplink channel estimation coefficients of the representative antennas of the base stations DU 1 and DU b at the time point t, and is represented as:

$$C_{1b}(t) = \hat{h}_{1 \to 1}^H(t) \, \hat{h}_{1 \to b}(t)$$
$$= h_{1 \to 1}^H(t) h_{1 \to b}(t) \cdot e^{j(2\pi(\varepsilon_1 - \varepsilon_b)t + \phi_1 - \phi_b)} + z_{1b}^c(t)$$

At a time point t+D (for example but not limited to, D=5 ms), the reference device RUE 1 transmits a reference signal to the representative antenna of the base station DU 1, as shown by a channel $h_{1 \to 1}(t+D)$. Similarly, the reference device RUE 1 transmits another reference signal to the representative antenna of the base station DU b, as shown by a channel $h_{1 \to b}(t+D)$. Thus, $C_{1b}(t+D)$ is obtained as:

$$C_{1b}(t+D) = h_{1 \to 1}^H(t+D) h_{1 \to b}(t+D) \cdot e^{j(2\pi(\varepsilon_1 - \varepsilon_b)(t+D) + \phi_1 - \phi_b)} + z_{1,r}^c(t+D)$$

Given that the change in a wireless channel in a time period D can be neglected, that is, $h_{1 \to b}(t) \approx h_{1 \to b}(t+D)$, the outer CFO between the representative antennas of the base stations DU 1 and DU b can be estimated by using $R_{1b}(t, t+D)$, where $R_{1b}(t, t+D)$ can be represented as:

$$R_{1b}(t, t+D) = C_{1b}^*(t)C_{1b}(t+D)$$
$$\approx |h_{1\to1}^H(t)h_{1\to b}(t)|^2 \cdot e^{j2\pi(\varepsilon_1-\varepsilon_b)D} + v(t, t+D)$$

The frequency carrier $\eta_1$ of the reference device RUE 1 is already removed when $C_{1b}(t)$ is calculated, and thus $C_{1b}(t+D)$ does not include the frequency carrier of the reference device RUE 1. Thus, the outer CFO between antenna groups (base stations) can be jointly estimated by using $N_r$ reference devices to obtain $R_{1b}$, as:

$$R_{1b}(t, t+D) = \sum_{r=1}^{N_r} |h_{r\to b}^H(t)h_{r\to b}(t)|^2 \cdot e^{j\frac{2\pi(\varepsilon_1-\varepsilon_b)D}{N}} + v(t, t+D)$$

The outer CFO between multiple antenna groups (base stations) is $\varepsilon_1-\varepsilon_b$; that is, the outer CFO between the representative antenna of the base station DU 1 and the representative antenna of the base station DU b is hidden in the phase of $R_{1b}$, and $\varepsilon_1-\varepsilon_b$ is estimated as:

$$\hat{\varepsilon}_{1b} = \frac{1}{2\pi D} \angle R_{1b}(t, t+D) \approx \varepsilon_1 - \varepsilon_b$$

Thus, the outer CFO between the representative antenna of the base station DU 1 and the representative antenna of the base station DU b can be deduced. Similarly, the outer CFO between representative antennas of the other antenna groups (base stations) can be obtained by the above method. Given that the number of reference devices is 1, when the outer CFO between antenna groups is estimated, $N_r=1$ is substituted.

In an exemplary embodiment of the disclosure, in a situation where antenna groups (base stations) are not aligned to the same signal source, for example, the antenna groups (base stations) are not GPS synchronized, the outer CFO between the individual representative antennas of the antenna groups is larger, and the influence of the outer CFO cannot be neglected. Therefore, step 210 needs to be performed to estimate the outer CFO between the representative antennas of the antenna groups (base stations). Conversely, if the antenna groups (base stations) are aligned to at the same signal source, for example, the antenna groups (base stations) are GPS synchronized, the outer CFO between the individual representative antennas of the antenna groups is smaller, and the influence of the outer CFO can be neglected and step 210 can be selectively omitted.

It is known from FIG. 4 and the related description that, the estimation for a CFO between base stations may include the following steps: the reference devices RUE 1 to RUE Nr respectively transmit reference signals to the individual representative antennas of the respective base stations DU 1 to DU Nb, the base stations DU 1 to DU Nb estimate uplink channel estimation coefficients of the respective representative antennas, and then the server CU collects the uplink channel estimation coefficients of the respective representative antennas estimated by the respective base stations, and accordingly estimates the outer CFOs between the respective representative antennas of the base stations.

Figure 5:
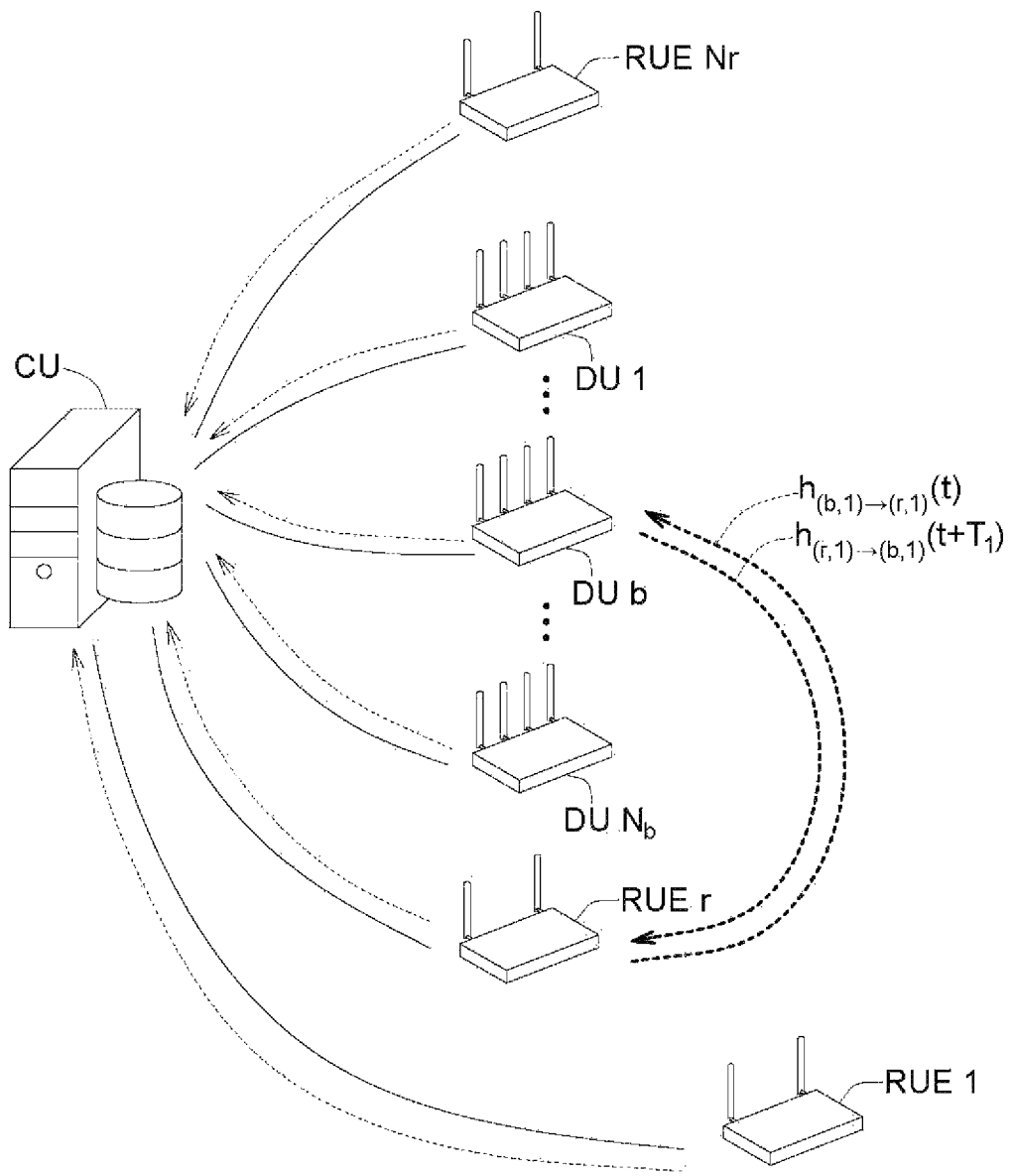
FIG. 5 shows inter-group antenna/beam channel calibration coefficient tracking and compensation according to an exemplary embodiment of the disclosure.

Inter-group antenna/beam channel calibration coefficient tracking and compensation (details of step 220 in FIG. 2) according to an exemplary embodiment of the disclosure is described with reference to FIG. 5. Herein, antennas included in a same base station are taken as an example of an antenna group for illustrations. That is, taking FIG. 1 for example, there are Nr base stations, and thus there are Nr antenna groups; however, the disclosure is not limited to the above example. In other exemplary embodiments of the disclosure, the antennas included in one base station can also be grouped into multiple antenna groups, which should also be encompassed with the scope of the spirit of the disclosure. However, in principle, the same antenna group belongs to the same base station; that is, antennas of different base stations are not grouped as the same antenna group. As shown in FIG. 5, at a time point t, the representative antenna of the base station DU b (i.e., the $b^{th}$ antenna group) transmits a reference signal to the reference device RUE R, and the reference device RUE r estimates a downlink channel to obtain a downlink channel estimation coefficient (also referred to as an inter-group downlink channel estimation value) as:

$$h_{(b,1)\to(r,1)}(t) = \beta_{r,1} \cdot g_{(b,1)\to(r,1)} \cdot \alpha_{b,1} \cdot e^{j(2\pi(\hat{\varepsilon}_{1b}+\varepsilon_b-\eta_r)t+\theta_{b,1}+\phi_{r,1})}$$

Next, at a time point t+T1, the reference device RUE r transmits another reference signal to the base station DU b, and the base station DU b estimates an uplink channel from the reference device RUE r to the base station DU b to obtain an uplink channel estimation coefficient (also referred to as an inter-group uplink channel estimation value) as:

$$h_{(r,1)\to(b,1)}(t+T_1) = \beta_{b,1} \cdot g_{(r,1)\to(b,1)} \cdot \alpha_{r,1} \cdot e^{j(-2\pi(\hat{\varepsilon}_{1b}+\varepsilon_b-\eta_r)(t+T_1)+\theta_{r,1}+\phi_{b,1})}$$

The outer channel estimation coefficient includes the uplink channel estimation value and the downlink channel estimation value.

By using the two formulae above, the server CU obtains an outer channel calibration coefficient (also referred to as an inter-group channel calibration coefficient) $c_{(b,1)\to(r,1)}(t+T_1)$ of the base station DU b, as:

$$c_{(b,1)\to(r,1)}(t+T_1) = \frac{h_{(b,1)\to(r,1)}(t)}{h_{(r,1)\to(b,1)}(t+T_1)}$$
$$= \frac{\frac{\alpha_{b,1}}{\beta_{b,1}}}{\frac{\alpha_{r,1}}{\beta_{r,1}}} e^{j(4\pi(\hat{\varepsilon}_{1b}+\varepsilon_b+\eta_r)t+2\pi(\hat{\varepsilon}_{1b}+\varepsilon_b-\eta_r)T_1+\theta_{b,1}+\phi_{r,1}-\theta_{r,1}-\phi_{b,1})}$$

Wherein, a time-variant phase is caused by $e^{j(4\pi(\hat{\varepsilon}_{1b}+\varepsilon_b-\eta_r)t)}$, and $\hat{\varepsilon}_{1b}$ is an inter-group CFO estimation value.

Further, the server CU can normalize the inter-group calibration coefficient $c_{(b,1)\to(r,k)}(t+T_1)$ of the base station DU b (associated with the calibration coefficients of the first antenna of the base station DU 1 and the first antenna of the reference device RUE r) according to the outer channel calibration coefficient $c_{(1,1)\to(r,1)}(t+T_1)$ of the base station DU 1 to obtain the outer channel calibration coefficient of the base station DU b, as:

$$c'_{(b,1)\to(r,k)}(t+T_1) = \frac{c_{(b,1)\to(r,1)}(t+T_1)}{c_{(1,1)\to(r,1)}(t+T_1)}$$

$$= \frac{\frac{\alpha_{b,n}}{\beta_{b,n}} * \frac{\alpha_{r,1}}{\beta_{r,1}}}{\frac{\alpha_{1,1}}{\beta_{1,1}} * \frac{\alpha_{r,k}}{\beta_{r,k}}} \frac{e^{j(4\pi(\varepsilon_{1b}+\varepsilon_b-\eta_r)t+2\pi(\varepsilon_{1b}+\varepsilon_b-\eta_r)T_1+\theta_{b,1}+\phi_{r,k}-\theta_{r,k}-\phi_{b,1})}}{e^{j(4\pi(\varepsilon_1-\eta_r)t+2\pi(\varepsilon_1-\eta_r)T_1+\theta_{1,1}+\phi_{r,k}-\theta_{r,1}-\phi_{1,1})}}$$

$$= \frac{\frac{\alpha_{b,1}}{\beta_{b,1}} * \frac{\alpha_{r,1}}{\beta_{r,1}}}{\frac{\alpha_{1,1}}{\beta_{1,1}} * \frac{\alpha_{r,k}}{\beta_{r,k}}} e^{j\left(\begin{array}{c}4\pi(\varepsilon_{1b}+\varepsilon_b-\varepsilon_1)t+2\pi(\varepsilon_{1b}+\varepsilon_b-\varepsilon_1)T_1+\\ \theta_{b,1}+\phi_{r,k}-\theta_{r,k}-\phi_{b,1}-\theta_{1,1}-\phi_{r,1}+\theta_{r,1}+\phi_{1,1}\end{array}\right)}$$

$$= \frac{\frac{\alpha_{b,1}}{\beta_{b,1}} * \frac{\alpha_{r,1}}{\beta_{r,1}}}{\frac{\alpha_{1,1}}{\beta_{1,1}} * \frac{\alpha_{r,k}}{\beta_{r,k}}} e^{j(\theta_{b,1}+\phi_{r,k}-\theta_{r,k}-\phi_{b,1}-\theta_{1,1}-\phi_{r,1}+\theta_{r,1}+\phi_{1,1})}$$

In an exemplary embodiment of the disclosure, performing normalization is to prevent errors from occurring in an equivalent channel as a result of RF mismatch between the base stations.

That is, in the exemplary embodiment, when inter-group antenna/beam channel calibration coefficient tracking and compensation is performed, respective representative antennas of the antenna groups transmit reference signals to respective reference devices, and the reference devices estimate respective downlink channels to obtain respective downlink channel estimation coefficients. Then, the reference devices transmit the reference signals to the respective representative antennas of the antenna groups, and the base stations estimate respective uplink channels to obtain respective channel estimation coefficients. According to the downlink channel estimation coefficients respectively returned by the reference devices and the uplink channel estimation coefficients respectively returned by the base stations, the server calculates the inter-group outer CFO and outer channel calibration coefficient.

Figure 6:
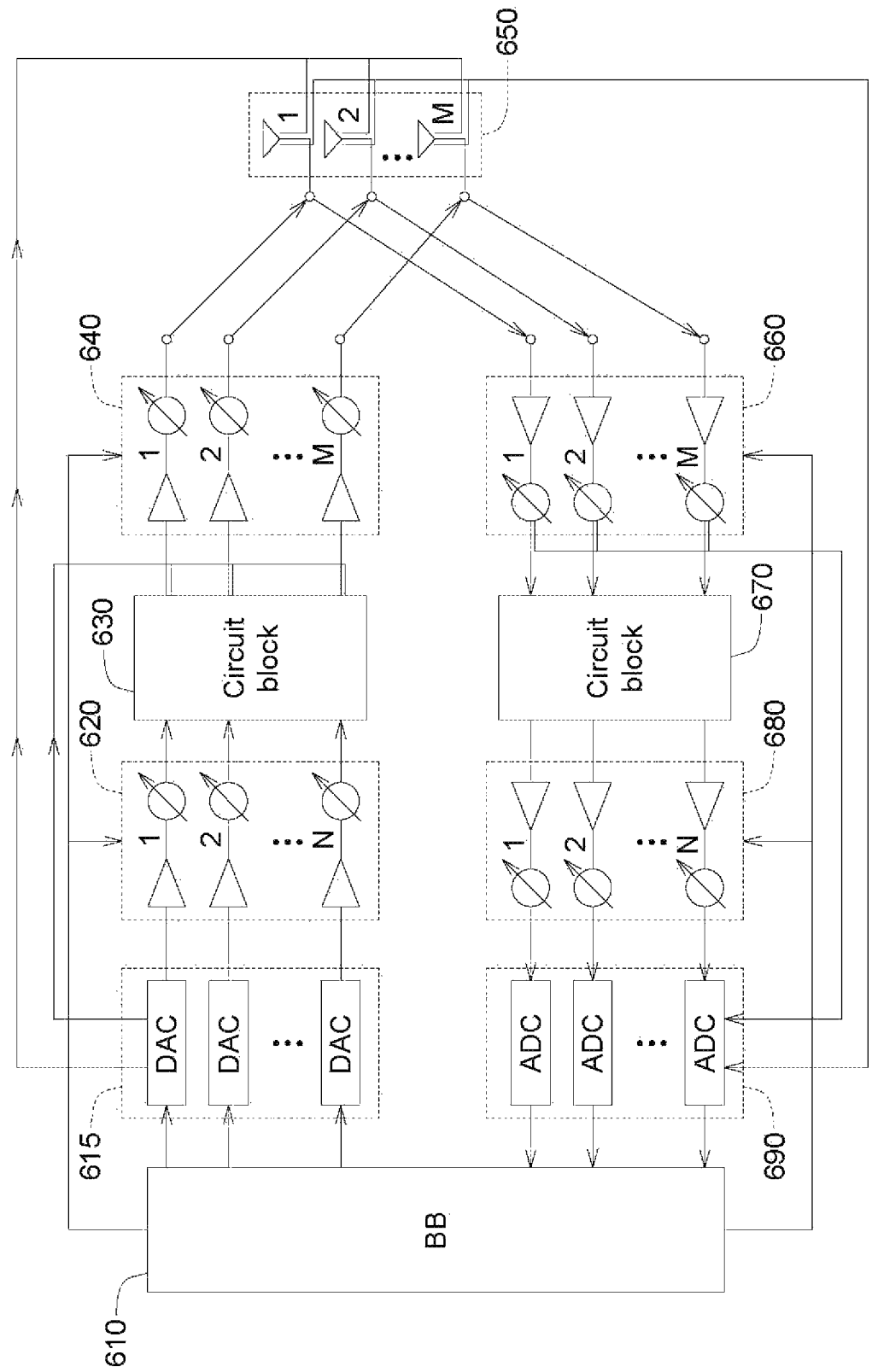
FIG. 6 shows intra-group antenna/beam channel calibration coefficient tracking and compensation according to an exemplary embodiment of the disclosure.

In an exemplary embodiment of the disclosure, when intra-group inner CFO tracking and channel compensation correction and intra-channel calibration are performed, the inner CFO tracking and channel calibration are performed by the representative antenna and the remaining non-representative antennas of the same antenna group. FIG. 6 shows intra-group inner CFO tracking and antenna/beam channel calibration coefficient tracking and compensation (step 225 and step 230 in FIG. 2) according to an exemplary embodiment of the disclosure. That is, in an exemplary embodiment of the disclosure, a representative antenna of the antenna group (the base station) is used as a reference, and reference signals are transmitted by the representative antenna and other antennas within the same antenna group (the base station) to perform intra-group inner CFO tracking and antenna/beam channel calibration.

In FIG. 6, a circuit block 610 represents a baseband circuit. DACs in a circuit block 615 (also referred to as a DAC block 615) are digital-to-analog converters, and are DACs of the $b^{th}$ antenna group (or the base station DU b). ADCs in a circuit block 690 (also referred to as an ADC block 690) are analog-to-digital converters, and are ADCs of the $b^{th}$ antenna group (or the base station DU b). A circuit block 620 and a circuit block 680 are respectively N signal amplifiers, and a circuit block 640 and a circuit block 660 are respectively M signal amplifiers. A circuit block 630 correspondingly converts N digital beams into M analog beams, and a circuit block 670 correspondingly converts M analog beams into N digital beams. Antennas (M antennas) of an antenna block 650 are antennas of the $b^{th}$ base station group (or the base station DU b). Wherein, M represents a total number of antennas of the $b^{th}$ antenna group (or the base station DU b), and N represents the number of digital beam ports.

At a time point t, in the $b^{th}$ antenna group (or the base station DU b), the representative antenna transmits a reference signal to the $1^{st}$ antenna, the representative antenna transmits a reference signal to the $m^{th}$ antenna, and the base station performs channel estimation to respectively obtain transmitting-end channel estimation coefficients of the $1^{st}$ antenna and the $m^{th}$ antenna, as:

$$h_{sw\to(b,1)}(t)=\beta_{b,1} \cdot g_{sw\to(b,1)} e^{j(-2\pi(\varepsilon_{b1}-\varepsilon_{sw})t+\phi_{b,1})}$$

$$h_{sw\to(b,m)}(t)=\beta_{b,m} \cdot g_{sw\to(b,m)} e^{j(-2\pi(\varepsilon_{bm}-\varepsilon_{sw})t+\phi_{b,m})}$$

Herein, a coefficient $C_{(b,1)(b,m)}$ is defined as an inner product of the transmitting-end channel estimation coefficients of the $1^{st}$ antenna and the $m^{th}$ antenna in the $b^{th}$ antenna group at the time point t, and is represented as:

$$C_{(b,1)(b,m)}(t)=h_{sw\to(b,1)}{}^H(t)h_{sw\to(b,m)}(t)$$

$$\beta_{b,1}{}^H g_{sw\to(b,1)}{}^H \beta_{b,m} g_{sw\to(b,m)} \cdot e^{j(2\pi(\varepsilon_{b1}-\varepsilon_{bm})t+\phi_{b,1}-\phi_{b,m})}+z^c_{(b,1)(b,m)}(t)$$

At a time point t+D (for example but not limited to D=5 ms), in the $b^{th}$ antenna group (or the base station DU b), the representative antenna transmits a reference signal to the $1^{st}$ antenna, and the representative antenna transmits the reference signal to the $m^{th}$ antenna, thus obtaining $C_{(b,1)(b,m)}(t+D)$ as:

$$C_{(b,1)(b,m)}(t+D) = h^H_{sw\to(b,1)}(t+D)h_{sw\to(b,m)}(t+D)$$
$$= \beta^H_{b,1} g^H_{sw\to(b,1)} \beta_{b,m} g_{sw\to(b,m)} \cdot$$
$$e^{j(2\pi(\varepsilon_{b1}-\varepsilon_{bm})(t+D)+\phi_{b,1}-\phi_{b,m})} +$$
$$z^c_{(b,1)(b,m)}(t+D)$$

The inner CFO between the $1^{st}$ antenna and the $m^{th}$ antenna in the $b^{th}$ antenna group can be estimated by using $R_{(b,1)(b,m)}(t, t+D)$, and $R_{(b,1)(b,m)}(t, t+D)$ can be represented as:

$$R_{(b,1)(b,m)}(t, t+D) = C^*_{(b,1)(b,m)}(t)C_{(b,1)(b,m)}(t+D)$$
$$\approx |\beta^H_{b,1}g^H_{sw\to(b,1)}\beta_{b,m}g_{sw\to(b,m)}|^2 \cdot$$
$$e^{j2\pi(\varepsilon_{b1}-\varepsilon_{bm})D} + v(t, t+D)$$

The inner CFO between the antennas in the antenna groups (base stations) is, taking the inner CFO between the $1^{st}$ antenna and the $m^{th}$ antenna in the $b^{th}$ antenna group for example, $\varepsilon_{b1}-\varepsilon_{bm}$ and is hidden in the phase of $R_{(b,1)(b,m)}$, and $\varepsilon_{b1}-\varepsilon_{bm}$ is estimated as:

$$\hat{\varepsilon}_{(b,1)(b,m)} = \varepsilon_{b1} - \varepsilon_{bm} = \frac{1}{2\pi D}\angle R_{(b,1)(b,m)}(t, t+D)$$

Thus, the inner CFO between the $1^{st}$ antenna and the $m^{th}$ antenna in the $b^{th}$ antenna group can be deduced. Similarly, the inner CFOs of the other antennas in the $b^{th}$ antenna group can be obtained by the above method.

In an exemplary embodiment of the disclosure, in a situation where antennas in an antenna group (a base station) are not aligned to the same signal source, the inner CFO between the individual antennas in the antenna groups is larger, the influence of the inner CFO cannot be neglected, and so step 225 needs to be performed to estimate the inner CFOs between individual antennas in the antenna group. Conversely, if the antennas in antenna group (the base station) are aligned to the same signal source, the inner CFO between the antennas in the antenna group is smaller, and the influence of the inner CFO can be neglected and step 225 can be selectively omitted.

Details of intra-antenna/beam channel calibration coefficient tracking and compensation (step 230) are given below. At a time point t, in the $b^{th}$ antenna group (or the base station DU b), the $m^{th}$ antenna transmits a reference signal to the representative antenna. According to the reference signal transmitted from the $m^{th}$ antenna to the representative antenna, the base station DU b can obtain an intra-group transmitting-end channel estimation coefficient as:

$$h_{(b,m)\to sw}(t)=g_{(b,m)\to sw}\cdot\alpha_{b,m}\cdot e^{j(2\pi(\varepsilon_{bm}-\varepsilon_{sw})t+\theta_{b,n})}$$

At a time point t+T1, in the $b^{th}$ antenna group (or the base station DU b), the representative antenna transmits a reference signal to the $m^{th}$ antenna. According to the reference signal received by the $m^{th}$ antenna, the intra-group receiving-end channel estimation coefficient can be obtained, as:

$$h_{sw\to(b,m)}(t+T_1)=\beta_{b,m}\cdot g_{sw\to(b,m)}e^{j(-2\pi(\varepsilon_{bm}\varepsilon_{sw})t+\phi_{b,m})}$$

The inner channel estimation coefficient includes the transmitting-end channel estimation coefficient and the receiving-terminal channel estimation coefficient.

Taking the $1^{st}$ antenna in the $b^{th}$ antenna group as a reference (the $1^{st}$ antenna is taken as the representative antenna for example for illustration; however, the disclosure is not limited thereto, and other antennas can be selected as the representative antenna), normalization is performed to obtain the inner channel calibration coefficient (i.e., the inner channel calibration coefficient):

$$c_{(b,m)\to(b,1)}(t+T_1) = \frac{h_{(b,m)\to sw}(t)/h_{sw\to(b,m)}(t+t_1)}{h_{(b,1)\to sw}(t)/h_{sw\to(b,1)}(t+t_1)}$$
$$= \frac{\frac{\alpha_{b,m}}{\beta_{b,m}}}{\frac{\alpha_{b,1}}{\beta_{b,1}}}e^{j(4\pi(\hat{\varepsilon}_{(b,1)(b,m)}-\varepsilon_{b1}+\varepsilon_{bm})t+2\pi(\hat{\varepsilon}_{(b,1)(b,m)}-\varepsilon_{b1}-\varepsilon_{bm})T_1+\theta_{b,m}+\phi_{b,1}-\theta_{b,1}-\phi_{b,m})}$$
$$\approx \frac{\frac{\alpha_{b,m}}{\beta_{b,m}}}{\frac{\alpha_{b,1}}{\beta_{b,1}}}e^{j(\theta_{b,m}+\phi_{b,1}-\theta_{b,1}-\phi_{b,m})}$$

In the above, if the inner CFO is non-existent, estimation and compensation for the inner CFO can be omitted, with however the inner channel calibration coefficient still needing to be obtained.

For the $b^{th}$ antenna group (or the base station DU b), the inner channel calibration coefficient (i.e., the intra-group inner channel calibration coefficient of the antennas) of each antenna (m=1, 2, . . . , M) is as:

$$c'_{(b,m)\to(r,k)}(t+T_1)=c_{(b,m)\to(b,1)}(t+T_1)c'_{(b,1)\to(r,k)}(t+T_1)$$

That is, in an exemplary embodiment of the disclosure, when intra-group channel calibration is performed, the representative antenna and other antennas in the antenna group transmit the reference signal to one another to obtain a plurality of transmitting-end channel estimation coefficients and a plurality of receiving-end channel estimation coefficients, the inner channel calibration value is accordingly calculated, and normalization is performed by using the representative antenna as a reference, thus obtaining the intra-group inner channel calibration coefficient of the antennas.

Details of how the server CU obtains the downlink channel information and calculates the precoder in step 240 are described below. An equivalent downlink channel of a user device can be calculated by using uplink channel estimation of a user device as well as an outer channel calibration coefficient and an inner channel calibration coefficient, as:

$$\hat{h}_{(b,n)\to(u,1)}(t+T_1) = c'_{(b,n)\to(r,k)}(t+T_1)h_{(u,1)\to(b,n)}(t+T_1)$$
$$= c'_{(b,n)\to(r,k)}(t+T_1)\cdot c'^{-1}_{(b,n)\to(u,1)}(t+T_1)\cdot$$
$$h_{(b,n)\to(u,1)}(t+T_1)$$
$$= \frac{h_{(u,1)\to(b,n)}(t+T_1)}{c'_{(r,k)\to(u,1)}(t+T_1)}e^{j(-2\pi(\varepsilon_b-\eta_u)T_1)}$$

The equivalent downlink channel is represented by a matrix, as:

$$\hat{H}(t+T_1) = \begin{bmatrix} c_{(r,k)\to(u,1)}^{-1}(t+T_1) & & \\ & \ddots & \\ & & c_{(r,k)\to(N_u,1)}^{-1}(t+T_1) \end{bmatrix} \cdot$$

$$\begin{bmatrix} e^{-j2\pi(\varepsilon_1-\eta_1)T_1}h_{b=1\to u=1}(t+T_1) & \cdots & e^{-j2\pi(\varepsilon_{N_b}-\eta_1)T_1}h_{b=N_b\to u=1}(t+T_1) \\ \vdots & \ddots & \vdots \\ e^{-j2\pi(\varepsilon_1-\eta_{N_u})T_1}h_{b=1\to u=N_u}(t+T_1) & \cdots & e^{-j2\pi(\varepsilon_{N_b}-\eta_{N_u})T_1}h_{b=N_b\to u=N_u}(t+T_1) \end{bmatrix}$$

$$= C_{(r,k)}^{-1}(t+T_1)H^{CFO}(t+T_1)$$

Thus, the server CU obtains a precoder $F_{ZF}$ according to the equivalent downlink channel of the user device, as:

$$F_{ZF}(t+T_1) = \hat{H}^H(t+T_1))(\hat{H}(t+T_1)\hat{H}^H(t+T_1))^{-1}$$

Details of joint transmission according to an exemplary embodiment of the disclosure are given below.

If N in FIG. 6 is equal to M, a situation of digital beamforming is considered present, and thus the intra-group channel calibration coefficient of antennas can be applied to baseband (the baseband circuit 610 in FIG. 6). A signal obtained after channel calibration is:

$$X(t+T_1) = F_{ZF}(t+T_1)S(t+T_1)$$

Further, if N=1 and M>1, a situation of analog beamforming is considered present, and the intra-group channel calibration coefficient can be applied to a phase rotator of an RF terminal. A signal obtained after channel calibration is:

$$X(t+T_1) = W_{RF}(t+T_1)S(t+T_1)$$

A weighting matrix of analog beamforming is as:

$$W_{RF} = \begin{bmatrix} 1 & & \\ & \ddots & \\ & & c_{(b,M)\to(b,1)}(t+T_1) \end{bmatrix} \begin{bmatrix} w_1 \\ \vdots \\ w_M \end{bmatrix}$$

In the above, $w_m$ is the weight of the $m^{th}$ antenna, and $c_{(b,m)\to(b,1)}(t+T_1)$ is the intra-group channel calibration coefficient (as described above) of the $m^{th}$ antenna.

If 1<N<M, a situation of hybrid beamforming is considered present, and common items of the intra-group channel calibration coefficient can be applied to a baseband terminal, and different items can be applied to phase rotator. A signal obtained after channel calibration is:

$$X(t+T_1) = W_{RF}(t+T_1)TF_{ZF}(t+T_1)S(t+T_1)$$

In the above, T is an M×N intra-group translational matrix of antennas.

However, at a second time point $T_2$, an actual downlink channel is $H(t+T_2)$, and thus if precoding is performed at the second time point $T_2$ according to the calculated precoding matrix $X(t+T_1)$, an unsatisfactory precoding effect may be resulted.

As described above, by using a reference device, issues of synchronization between base stations, a time-varying effect of RF responses, selective channel attenuation caused by frequencies, and acquisition of downlink channel status information can be solved. However, the channel calibration coefficient leads to a time-varying phase due to estimation errors, and a channel of a next time point is used after a current precode is generated. That is, a precoding matrix generated at a first time point $T_1$ is used at a second time point $T_2$, and an unsatisfactory precoding effect is resulted by time-varying properties of the channel (e.g., the phase changes with time), hence degrading the system performance.

In step 240, the server CU uses a prediction function $p_b(t+T_2)$ to predict a second downlink channel of a user device at the second time point $T_2$ and to predict the time-varying phase of the channel calibration coefficient at the time point $T_2$, so as to obtain more accurate downlink channel information and improve precoding effects.

According to the prediction function $p_b(t+T_2)$, an equivalent downlink channel of a user device at the second time point $T_2$ can be represented as:

$$\hat{h}_{(b,n)\to(u,1)}(t+T_1) = P_b(t+T_2) \cdot c'_{(b,n)\to(r,k)}(t+T_0) \cdot h_{(u,1)\to(b,n)}(t+T_1)$$

And the downlink channel can further be represented by a matrix, as:

$$\hat{H}(t+T_2) = P_b(t+T_2)C_{(r,k)}^{-1}(t+T_1)H^{CFO}(t+T_1)$$

In one exemplary embodiment, the server CU calculates multiple reference downlink channels of the user device at multiple reference time points according to multiple reference uplink channels and channel calibration coefficients of the user device at multiple reference time points, with the calculation method as described above. The server CU can then generate a prediction function according to the reference downlink channels. For example, the server CU can store multiple equivalent downlink channel values of the user device calculated at multiple past time points, calculate a prediction trend according to the equivalent downlink channel values of the past time points stored, and accordingly generate a prediction function.

Figure 7:
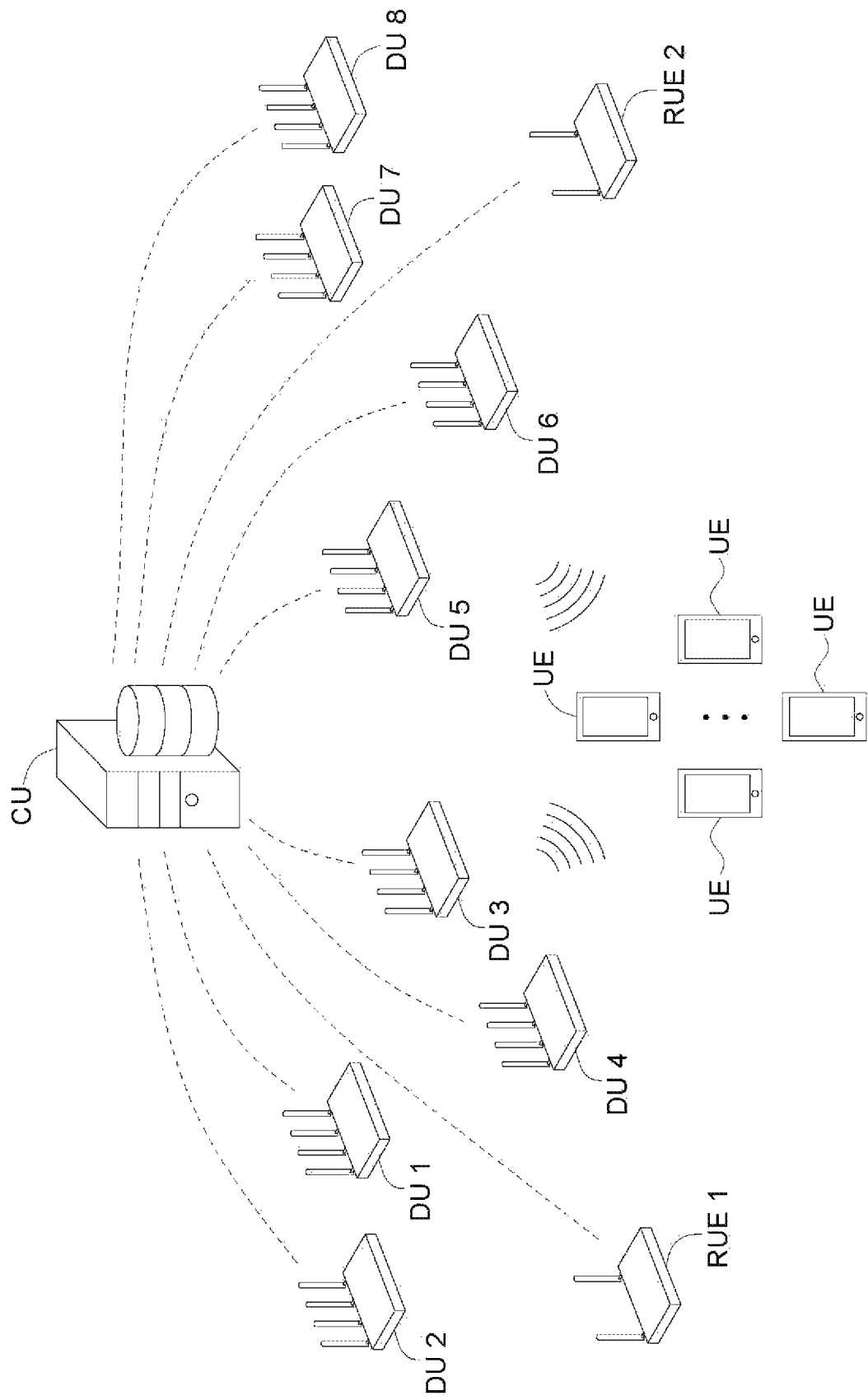
FIG. 7 is a schematic diagram according to an exemplary embodiment of the disclosure, wherein the exemplary embodiment is applicable to more than one reference device.

FIG. 7 shows a schematic diagram according to an exemplary embodiment of the disclosure, wherein the exemplary embodiment is applicable to more than one reference device.

Figure 8:
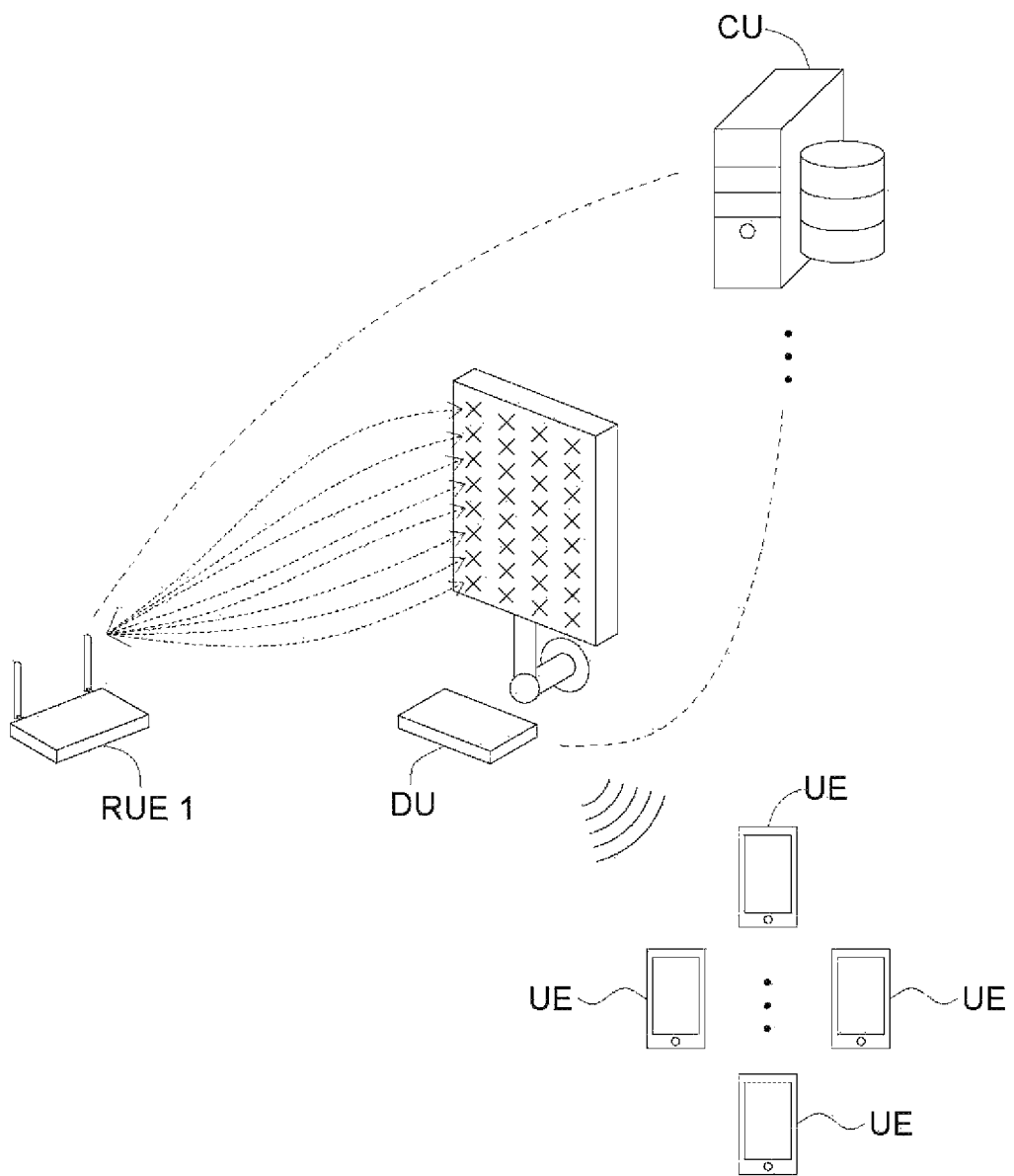
FIG. 8 is a schematic diagram of an exemplary embodiment of the disclosure applied in a single-base station massive antenna system.

FIG. 8 shows a schematic diagram of an exemplary embodiment of the disclosure applied to a single-base station massive antenna system. Assume that the base station DU includes 64 antennas. These antennas can be grouped into eight antenna groups, and each of the antenna groups includes eight antennas. Details of the channel calibration are as described above.

Figure 9:
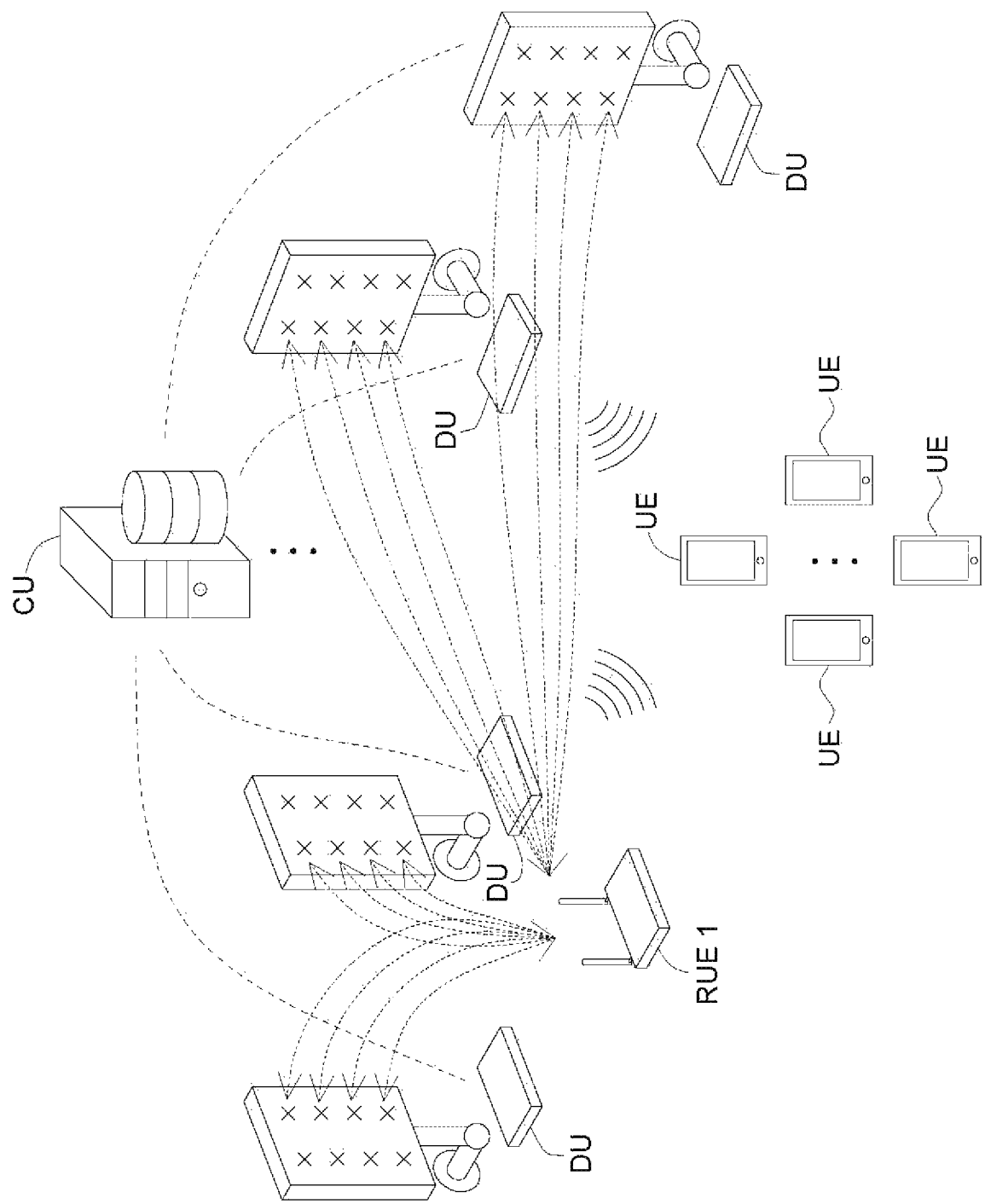
FIG. 9 is a schematic diagram of an exemplary embodiment of the disclosure applied in a multi-base station massive antenna system.

FIG. 9 shows a schematic diagram of an exemplary embodiment of the disclosure applied to a multi-base station massive antenna system. Assume that each base station DU includes 64 antennas. Details of the intra-group channel calibration and inter-group channel calibration in FIG. 9 can be referred from the above description and the description associated with FIG. 8, and are omitted herein.

Figure 10:
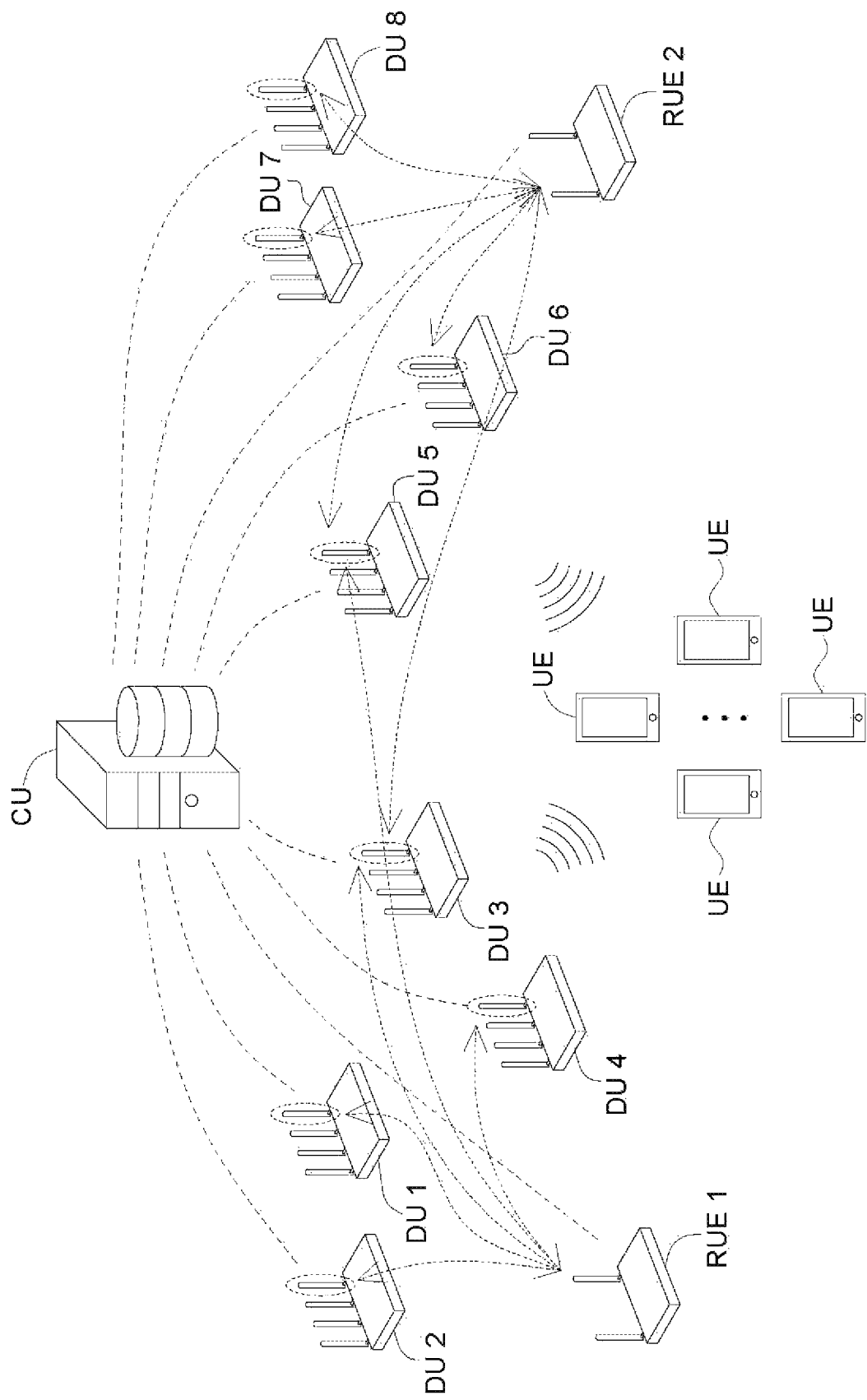
FIG. 10 is a schematic diagram of an exemplary embodiment of the disclosure applied in a multi-base station coordination system.

FIG. 10 shows a schematic diagram of an exemplary embodiment of the disclosure applied to a multi-base station coordination system. In FIG. 10, each of the reference devices does not serve all of the base stations. For example, the reference device RUE 1 serves five base stations DU 1 to DU 5, and another reference device RUE 2 serves five base stations DU 3 and DU 5 to DU 8. Service objects of the two reference devices RUE 1 and RUE 2 are overlapping (DU 3 and DU 5 are overlapping). That is, the reference device RUE 1 does not serve base stations DU 6 to DU 8 (the reference signal of the reference device RUE 1 is not transmitted to the base stations DU 6 to DU 8); the reference device RUE 2 does not serve the base stations DU 1, DU 2 and DU 4 (the reference signal of the reference device RUE 2 is not transmitted to the base stations DU 1, DU 2 and DU 4). However, when channel calibration is performed, the channel calibration of the eight base stations DU 1 to DU 8 can also be performed as the example where each of the reference devices serves all of the base stations. Such repeated details are omitted herein.

Figure 11:
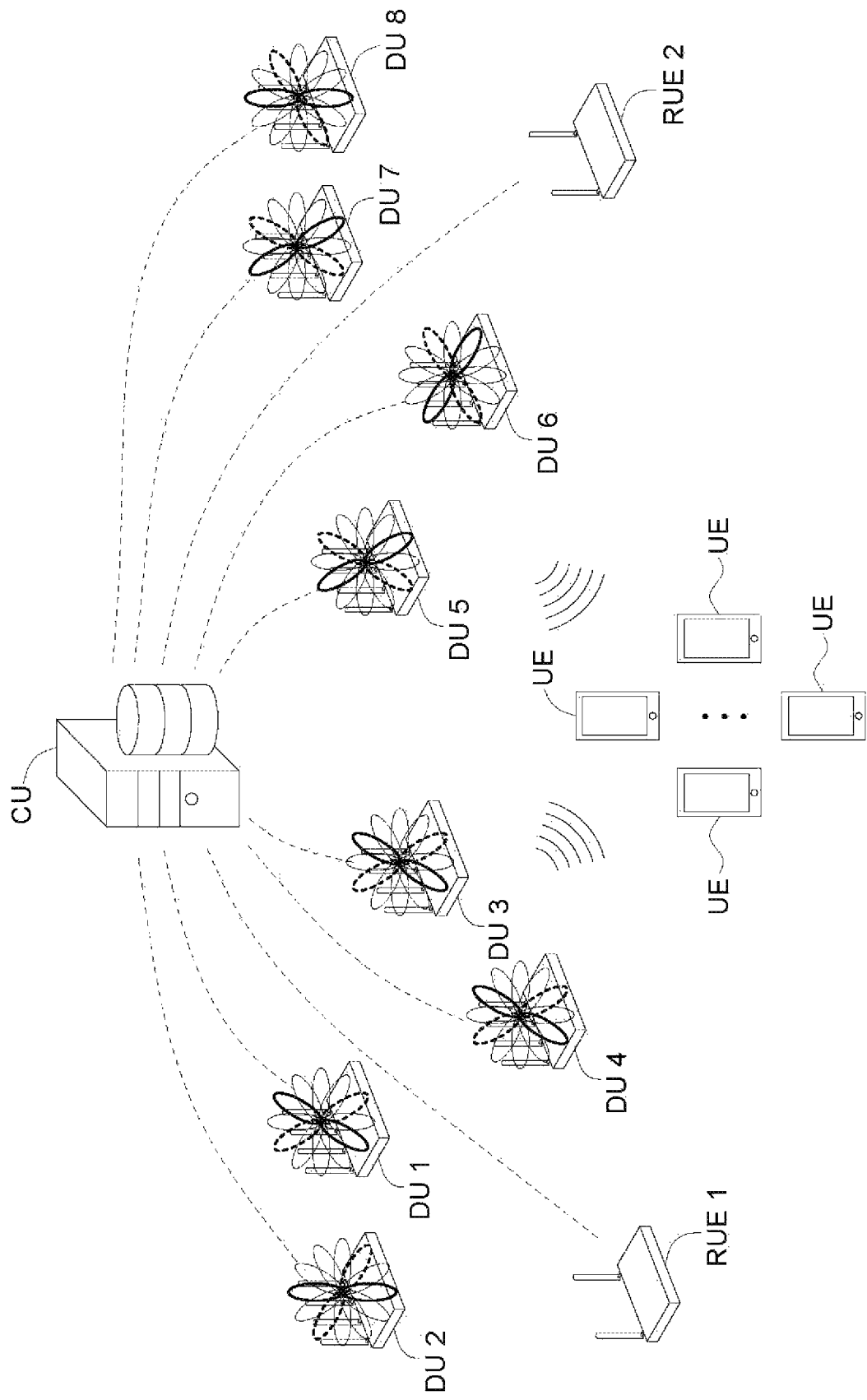
FIG. 11 is a schematic diagram of an exemplary embodiment of the disclosure applied in a multi-base station coordination system.

FIG. 11 shows a schematic diagram an exemplary embodiment of the disclosure applied in a multi-base station coordination system. Each of the base stations DU 1 to DU 8 includes a plurality of beams (one beam is formed by, for example but not limited to, four antennas). In FIG. 11, intra-group channel calibration and inter-group channel calibration are performed by using beams as a basic unit. In the above examples, one single antenna is used as a basic unit for transceiving signals; in FIG. 11, beams are used as a basic unit for transceiving signals. That is, in FIG. 11, one antenna group includes a plurality of beams. Further, each base station can use one of the beams to serve a reference device, and use another beam to serve a user device UE. Thus, if a reference device and a user device are served by different beams of the same base station, the channel calibration coefficient (including a beam calibration coefficient) of the reference device can be obtained by using the method in the above-described exemplary embodiments of the disclosure to further calibrate the another beam serving the user device. Such is also encompassed within the scope of the spirit of the disclosure.

Figure 12:
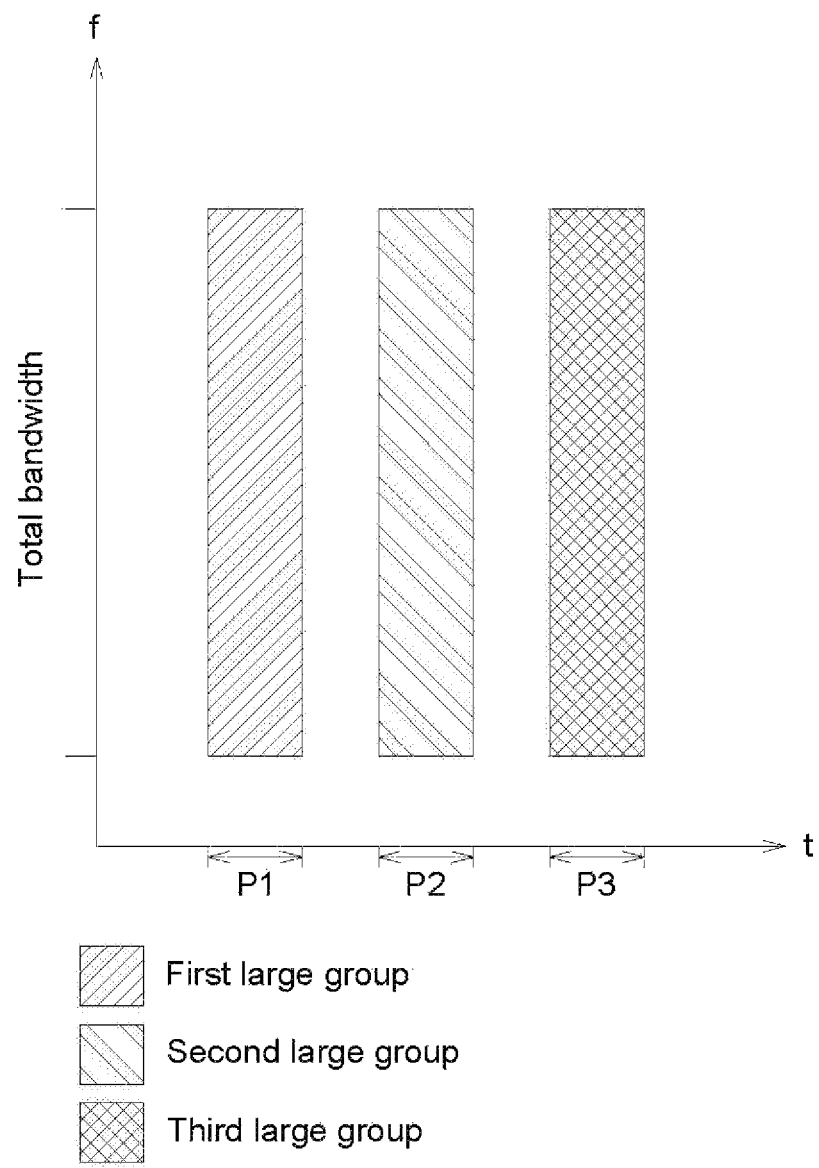
FIG. 12 shows channel estimation performed by means of time-division multiplexing in an exemplary embodiment of the disclosure.

FIG. 12 shows channel calibration performed by using a concept of time-division multiplexing in an exemplary embodiment of the disclosure. FIG. 12 can be applied in a situation where the number of antenna groups exceeds an upper limit of reference signals, for example but not limited to, when a multi-antenna system has 96 antenna groups, and an upper limit of reference signals is 32. Thus, the 96 antenna groups can be further grouped into three large antenna groups. In a time period P1, channel calibration is performed on the first large antenna group; in a time period P2, channel calibration is performed on a second large antenna group; in a time period P3, channel calibration is performed on a third large antenna group. Associated details can be referred from the above description, and are omitted herein.

It is known from the above description that, in the exemplary embodiments of the disclosure, by hierarchical channel calibration (the so-called hierarchical channel calibration includes inter-group channel calibration of antennas and intra-group channel calibration of antennas), the issue of synchronization between base stations and the issue of channel calibration of multiple base stations can be solved, while spectrum utilization efficiency of a multi-antenna system is enhanced. The multi-antenna system provided by the exemplary embodiments of the disclosure is capable of simplifying a channel calibration process.

It will be apparent to those skilled in the art that various modifications and variations can be made to the disclosed exemplary embodiments. It is intended that the specification and examples be considered as exemplary only, with a true scope of the disclosure being indicated by the following claims and their equivalents.

What is claimed is:

1. A multi-antenna system, comprising:
a server;
a first antenna group, comprising a plurality of first antennas, the first antennas comprising a first representative antenna and at least one first non-representative antenna, the first antennas provided on a first base station of at least one base station, the first base station of the at least one base station configured to perform intra-group channel estimation to obtain and transmit to the server a plurality of first inner channel estimation coefficients between the first representative antenna and each of the at least one first non-representative antenna, wherein the first base station of the at least one base station serves at least one user device; and
at least one reference device, communicating with the server and the first antennas, configured to perform channel estimation between the at least one reference device and the first representative antenna to obtain and transmit to the server a plurality of outer channel estimation coefficients between the at least one reference device and the first representative antenna;
wherein, the server is configured to calculate a precoding matrix according to the first inner channel estimation coefficients and the first outer channel estimation coefficients, and the at least one base station performs data transmission with the at least one user device according to the precoding matrix.

2. The multi-antenna system according to claim 1, wherein the server is configured to obtain a plurality of first inner channel calibration coefficients according to the first inner channel estimation coefficients, to obtain a first outer channel calibration coefficient according to the first outer channel estimation coefficients, and to calculate the precoding matrix according to the first inner channel calibration coefficients and the first outer channel calibration coefficient.

3. The multi-antenna system according to claim 2, wherein the first base station of the at least one base station is configured to obtain and transmit to the server a plurality of transmitting-end channel estimation coefficients and a plurality of receiving-end channel estimation coefficients between the first representative antenna and the at least one first non-representative antenna, and each of the first inner channel estimation coefficients comprises the corresponding transmitting-end channel estimation coefficient and the corresponding receiving-end channel estimation coefficient.

4. The multi-antenna system according to claim 3, wherein the at least one reference device is configured to obtain and transmit to the server an uplink channel estimation coefficient and a downlink channel estimation coefficient between the at least one reference device and the first representative antenna, and the first outer channel estimation coefficients comprise the uplink channel estimation coefficient and the downlink channel estimation coefficient.

5. The multi-antenna system according to claim 4, wherein the server is configured to further estimate at least one outer carrier frequency offset (CFO) between the first representative antenna and the at least one reference device according to the outer uplink channel estimation coefficients between the first representative antenna and the at least one reference device, and to compensate the first outer channel calibration coefficients according to the at least one outer CFO.

6. The multi-antenna system according to claim 5, wherein the server is configured to further estimate a plurality of inner CFOs between the first representative antenna and the at least one first non-representative antenna according to the first inner channel estimation coefficients between the first representative antenna and the at least one first non-representative antenna, and to compensate the first inner channel calibration coefficients according to the inner CFOs.

7. The multi-antenna system according to claim 1, further comprising:
 a second antenna group, comprising a plurality of second antennas communicating with the at least one reference device, the second antennas comprising a second representative antenna and at least one second non-representative antenna, the second antennas provided on the first base station of the at least one base station;
 wherein, the first base station of the at least one base station is configured to perform intra-group channel estimation to obtain and transmit to the server a plurality of second inner channel estimation coefficients between the second representative antenna and each of the at least one second non-representative antenna;
 the at least one reference device is configured to further perform channel estimation between the at least one reference device and the second representative antenna to obtain and transmit to the server a plurality of second outer channel estimation coefficients between the at least one reference device and the second representative antenna;
 the server is configured to further calculate the precoding matrix according to the first inner channel estimation coefficients, the second inner channel estimation coefficients, the first outer channel estimation coefficients, and the second outer channel estimation coefficients.

8. The multi-antenna system according to claim 1, wherein the at least one reference device is a mobile device, a personal computer or an idle base station.

9. The multi-antenna system according to claim 7, wherein when inter-group channel calibration is performed, the server normalizes the first outer channel calibration coefficient and the second outer channel calibration coefficient.

10. The multi-antenna system according to claim 7, wherein when intra-group channel calibration is performed, the server normalizes the first inner channel calibration coefficients and the second inner channel calibration coefficients.

11. The multi-antenna system according to claim 1, comprising a plurality of base stations and a plurality of reference devices, wherein each of the reference devices serves some of the base stations, and objects served by the reference devices are overlapping.

12. The multi-antenna system according to claim 1, wherein the first base station of the at least one base station comprises a plurality of beams, each of the beams is formed by the first antennas, the at least one base station uses one of the beams to serve the at least one reference device and uses another beam to serve the at least one user device, and a channel calibration coefficient of the reference device is used to calibrate the another beam serving the user device.

13. A channel calibration method for a multi-antenna system, the multi-antenna comprising a server, a first antenna group, at least one base station and at least one reference device, the first antenna group comprising a plurality of first antennas, the first antennas comprising a first representative antenna and at least one first non-representative antenna, the first antennas provided on at least one base station, the channel calibration method comprising:
 performing, by a first base station of the at least one base station, intra-group channel estimation to obtain and transmit to the server a plurality of first inner channel estimation coefficients between the first representative antenna and each of the at least one first non-representative antenna, wherein the first base station of the at least one base station serves at least one user device;
 performing, by the at least one reference device, channel estimation between the at least one reference device and the first representative antenna to obtain and transmit to the server a plurality of outer channel estimation coefficients between the at least one reference device and the first representative antenna; and
 calculating, by the server, a precoding matrix according to the first inner channel estimation coefficients and the first outer channel estimation coefficients, and performing data transmission with the at least one user device according to the precoding matrix by the at least one base station.

14. The channel calibration method for a multi-antenna system of claim 13, further comprising:
 obtaining, by the server, a plurality of first inner channel calibration coefficients according to the first inner channel estimation coefficients, obtaining a first outer channel calibration coefficient according to the first outer channel estimation coefficients by the server, and calculating the precoding matrix according to the first inner channel calibration coefficients and the first outer channel calibration coefficient by the server.

15. The channel calibration method for a multi-antenna system of claim 14, further comprising:
 obtaining and transmitting to the server, by the first base station of the at least one base station, a plurality of transmitting-end channel estimation coefficients and a plurality of receiving-end channel estimation coefficients between the first representative antenna and the at least one first non-representative antenna, wherein each of the first inner channel estimation coefficients comprises the corresponding transmitting-end channel estimation coefficient and the corresponding receiving-end channel estimation coefficient.

16. The channel calibration method for a multi-antenna system of claim 15, further comprising:
 obtaining and transmitting to the server, by the at least one reference device, an uplink channel estimation coefficient and a downlink channel estimation coefficient between the at least one reference device and the first representative antenna, wherein the first outer channel estimation coefficients comprise the uplink channel estimation coefficient and the downlink channel estimation coefficient.

17. The channel calibration method for a multi-antenna system of claim 16, further comprising:
 estimating, by the server, at least one outer carrier frequency offset (CFO) between the first representative antenna and the at least one reference device according to the outer uplink channel estimation coefficients between the first representative antenna and the at least one reference device, and compensating the first outer channel calibration coefficients according to the at least one outer CFO by the server.

18. The channel calibration method for a multi-antenna system of claim 15, further comprising:
 estimating, by the server, a plurality of inner CFOs between the first representative antenna and the at least one first non-representative antenna according to the first inner channel estimation coefficients between the first representative antenna and the at least one first non-representative antenna, and compensating, by the server, the first inner channel calibration coefficients according to the inner CFOs.

19. The channel calibration method for a multi-antenna system of claim 13, wherein the multi-antenna system further comprises a second antenna group, the second antenna group comprises a plurality of second antennas communicating with the at least one reference device, the second antennas comprise a second representative antenna and at least one second non-representative antenna, and the second antennas are provided on the first base station of the at least one base station; the channel calibration method further comprises:
 performing, by the first base station of the at least one base station, intra-group channel estimation to obtain and transmit to the server a plurality of second inner channel estimation coefficients between the second representative antenna and each of the at least one second non-representative antenna;
 performing, by the at least one reference device, channel estimation between the at least one reference device and the second representative antenna to obtain and transmit to the server a plurality of second outer channel estimation coefficients between the at least one reference device and the second representative antenna; and
 calculating, by the server, the precoding matrix according to the first inner channel estimation coefficients, the second inner channel estimation coefficients, the first outer channel estimation coefficients, and the second outer channel estimation coefficients.

20. The channel calibration method for a multi-antenna system of claim 13, wherein the at least one reference device is a mobile device, a personal computer or an idle base station.

21. The channel calibration method for a multi-antenna system of claim 19, wherein when inter-group channel calibration is performed, the server normalizes the first outer channel calibration coefficient and the second outer channel calibration coefficient.

22. The channel calibration method for a multi-antenna system of claim 19, wherein when intra-group channel calibration is performed, the server normalizes the first inner channel calibration coefficients and the second inner channel calibration coefficients.

23. The channel calibration method for a multi-antenna system of claim 13, wherein the multi-antenna system comprises a plurality of base stations and a plurality of reference devices, each of the reference devices serves some of the base stations, and objects served by the reference devices are overlapping.

24. The channel calibration method for a multi-antenna system of claim 13, wherein the first base station of the at least one base station comprises a plurality of beams, each of the beams is formed by the first antennas, the at least one base station uses one of the beams to serve the at least one reference device and uses another beam to serve the at least one user device, and a channel calibration coefficient of the reference device is used to calibrate the another beam serving the user device.

\* \* \* \* \*